Sept. 29, 1964 R. V. FORMOST 3,150,636

FISH FEEDING AND OBSERVING APPARATUS

Filed Oct. 17, 1962

INVENTOR.
ROY V. FORMOST
BY

United States Patent Office 3,150,636
Patented Sept. 29, 1964

3,150,636
FISH FEEDING AND OBSERVING APPARATUS
Ray V. Formost, 6244 El Cajon Blvd., Suite 20,
San Diego, Calif.
Filed Oct. 17, 1962, Ser. No. 231,141
10 Claims. (Cl. 119—5)

The present invention relates to a fish feeding and observing apparatus and more particularly to a fish feeding and observing apparatus providing tables for a relaxed observation and feeding advantage.

According to the invention, a large shallow aquarium is provided having a transparent top which is utilized as the floor for the placement thereon of tables and chairs. Thus, in the event the top of the aquarium is utilized as a restaurant site for an example, the patrons can be seated at the various tables and can observe the fish through the transparent top of the aquarium or floor of the restaurant. The transparent top of the aquarium is provided with a plurality of apertures and each table has at least one aperture in the top thereof. Each aperture in each table top is connected through a hollow tube with an aperture of the transparent top of the aquarium. This provides means through which fish food can be transmitted from customers seated at the tables down through the tubes into the aquarium, thus attracting the fish in close proximity to the individual table from which they are fed and observed. The table tops can also be constructed of transparent material to further facilitate the viewing of the fish.

It is thus an object of the present invention to provide a fish feeding and observing apparatus in which a plurality of fish feeding and observing locations are provided.

Another object of the present invention is the provision of fish feeding and observing apparatus in which the individual observation locations are provided with means for feeding the fish.

A further object of the invention is the provision of a fish feeding and observing apparatus which is convenient and allows for the comfort of the observer and feeder of the fish.

Other objects and many of the attendant advantages thereof will become more readily apparent when referenced to the following detailed description taken in conjunction with the drawing in which like reference numerals designate like parts and wherein.

Figure 1:
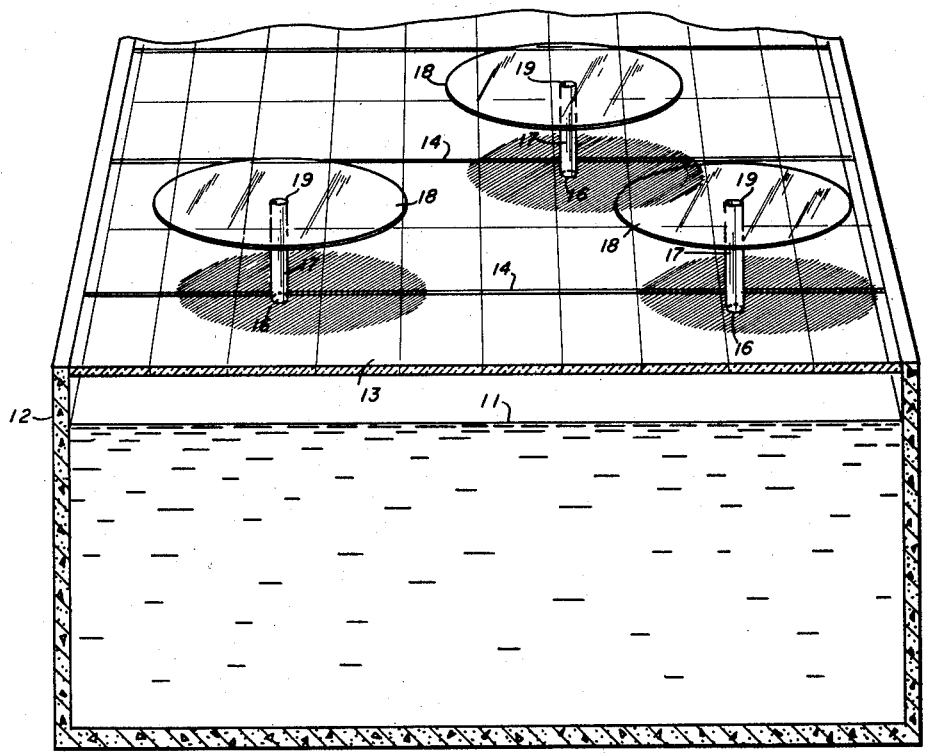
FIG. 1 is a perspective view of a preferred embodiment of the invention.

Referring to FIG. 1 there is shown a tank 11 having sides 12 and top portion 13. Top portion 13 is constructed of a transparent material such as tempered glass which is placed on support members 14. Top section 13 has a series of apertures 16 around which table support tubes 17 are placed. On top of table support tubes 17 are transparent table tops 18 having apertures 19 in communication with support members 17.

Figure 2:
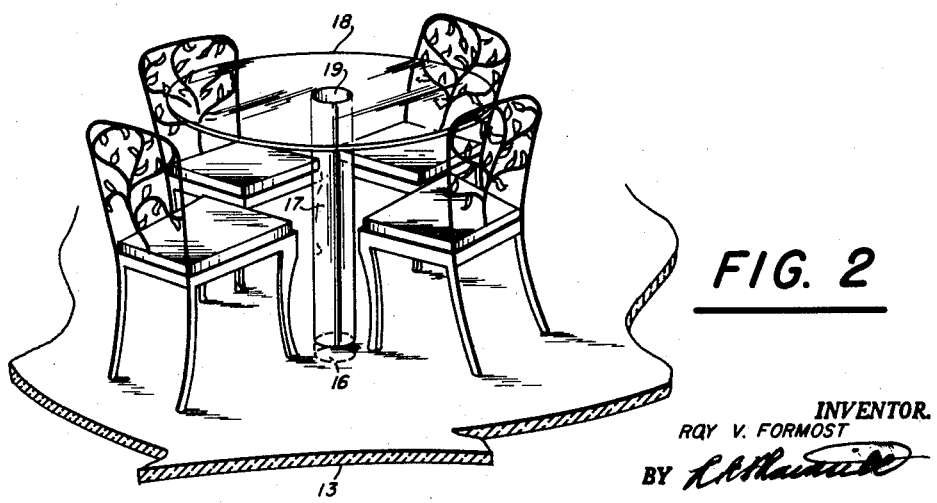
FIG. 2 is a more detailed perspective view of the preferred embodiment of the invention.

Referring to FIG. 2 there is shown a detailed perspective drawing of one of the tables of FIG. 1. Tube support member 17 communicates with aperture 16 of transparent aquarium top 13, and with aperture 19 of table top 18.

When the instant invention is utilized, for example, as an attraction in a restaurant or cocktail lounge it can be seen that patrons seated at tables located over apertures 16 will be able to view the fish swimming in the aquarium underneath, and, if fish food is provided in small containers at each table, they will be able to feed the fish through apertures 19, tubes 17 and apertures 16 to the aquarium below thereby attracting the fish for a closer view at each location.

It should be understood, of course, that the foregoing disclosure relates to only a preferred embodiment of the invention and that it is intended to cover all changes and modifications of the invention herein chosen for the purposes of the disclosure which do not constitute departure from the spirit and scope of the invention.

What is claimed is:

1. Fish feeding and observing apparatus comprising an aquarium, said aquarium having a transparent top with a plurality of apertures therein, a plurality of tables positioned over said apertures, each of said tables having supporting means and a top portion, said top portions each having at least one aperture therein, said supporting means comprising a hollow tube connecting each of said apertures in said top portions with an aperture in said transparent top.

2. The fish feeding and observing apparatus of claim 1 wherein said top portion is constructed of a transparent material.

3. The fish feeding and observing apparatus of claim 1 wherein said transparent top comprises a sheet of tempered glass resting on a plurality of supporting members.

4. Fish feeding and observing apparatus comprising an aquarium, said aquarium having a transparent top with a plurality of apertures therein, a plurality of tables, a separate one of said tables positioned over a different one of said apertures, each of said tables having a top portion, said top portions each having at least one aperture therein, and a hollow tube connecting each of said apertures in said top portions with an aperture in said transparent top.

5. The fish feeding and observing apparatus of claim 4 wherein said hollow tubes comprise supporting means for said top portions.

6. The fish feeding and observing apparatus of claim 4 wherein said top portion is constructed of a transparent material.

7. The fish feeding and observing apparatus of claim 4 wherein said transparent top comprises a sheet of tempered glass resting on a plurality of supporting members.

8. Fish feeding and observing apparatus comprising an aquarium, said aquarium having a transparent top with a plurality of apertures therein, a plurality of tables positioned in proximity to said apertures and a plurality of hollow tubes each of which having one end in proximity with one of said tables and the other end communicating with one of said apertures.

9. The fish feeding and observing apparatus of claim 8 wherein said hollow tubes are supporting means for said tables.

10. The fish feeding and observing apparatus of claim 8 wherein said transparent top comprises a sheet of tempered glass resting on a plurality of supporting members.

References Cited in the file of this patent
UNITED STATES PATENTS

| 324,508 | Wenmaekers | Aug. 18, 1885 |
| 1,764,356 | Schlotz | June 17, 1930 |
| 2,002,380 | Wernicke et al. | May 21, 1935 |
| 2,133,740 | Donohoue | Oct. 18, 1938 |